(No Model.)
R. CAMPBELL.
DEVICE FOR CONVERTING MOTION.
No. 322,679. Patented July 21, 1885.
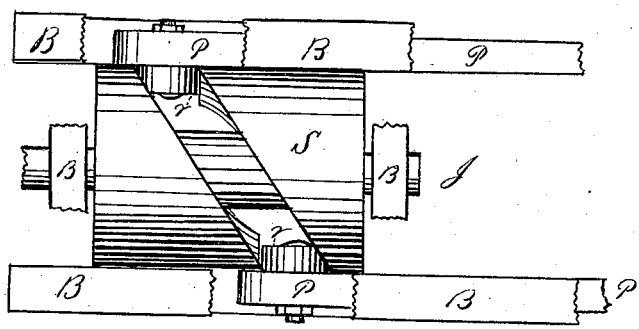
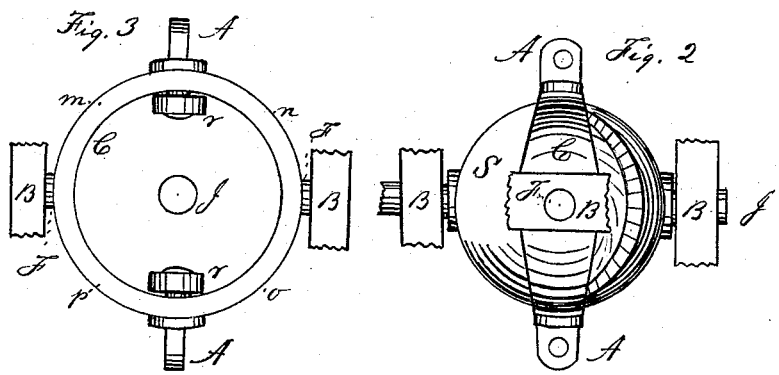
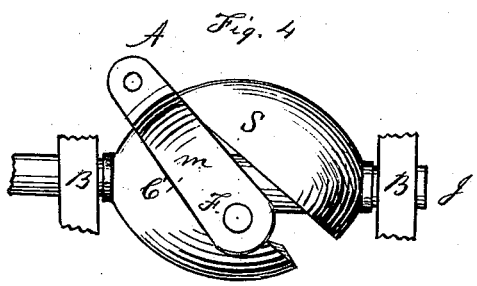
Witnesses
F. W. Campbell
Louis Staitz
Inventor
Robert Campbell

UNITED STATES PATENT OFFICE.

ROBERT CAMPBELL, OF ALLEGHENY, PENNSYLVANIA.

DEVICE FOR CONVERTING MOTION.

SPECIFICATION forming part of Letters Patent No. 322,679, dated July 21, 1885.

Application filed December 15, 1884. (No model.)

*To all whom it may concern:*

Be it known that I, ROBERT CAMPBELL, a citizen of the United States, residing in Allegheny, in the county of Allegheny and State of Pennsylvania, have invented a new and useful Improvement in Gearing, of which the following is a specification.

My invention relates to gearing in which a spindle having two reverting curves is connected with one or more piston-rods, pitmen, or connecting-rods.

The object of my invention is the interconversion of reciprocating or vibrating motion and rotary motion—that is, the conversion of vibrating motion into rotary motion and the conversion of rotary motion into vibrating or reciprocating motion by the same means. I attain this object by the mechanism illustrated in the accompanying drawings, which form a part of this specification.

Similar letters refer to similar parts throughout the several views.

Figure 1 represents a spindle, S, engaged by two piston-rods or connecting-rods, P P, by means of anti-friction rollers $r$ $r$. B B are guides or slide-bearings for the piston-rod P. B' B' are the bearings of the axis or journals J of the spindle.

Fig. 2 represents a spherical spindle, S. C is a ring having one or more arms, A, with which a piston-rod or pitman (not shown) may be connected. F is one of the fulcra supporting the ring C. A may be located at $m$, $n$, $o$, or $p$.

Fig. 3 represents the ring C in its position as related to the axis or journal J of the spindle, which is not shown in order to exhibit the anti-friction rollers $r$ $r$.

Fig. 4 represents a spheroidal spindle. F is shown as a fulcrum, the bearing not being shown. C' represents the yoke, having the arm A and the anti-friction roller $r$, respectively engaging a piston-rod or other device and the spindle S. The opposite fulcrums in this case are more or less distant from the center of the axis or journal of the spindle S radially, to accommodate the surface of the spindle, which may be more or less spheroidal.

The radical improvement is in the adaptation of the ratio of the diameter of the spindle to the stroke of vibration where two strokes give a complete revolution to the spindle.

The mechanical limitations are a spindle having two reverting curves and a diameter at least equal to the stroke of the engaged piston, piston-rod, pitman, connecting-rod, or other device which operates or is operated by the spindle.

I am fully aware that spindles have been in use for many years; but I am not aware that either the state of the art or the claims of any individual embodies the particular features of this invention.

Having carefully described my invention, I petition and desire protection in Letters Patent in claiming—

In gearing, a spindle having the diameter of its operative groove or bearings equal to or greater than the stroke of the piston-rod, connecting-rod, or lever engaged and operating or operated, in combination with anti-friction rollers, substantially as set forth, and for the purposes described.

ROBERT CAMPBELL.

Witnesses:
F. W. CAMPBELL,
LOUIS STEITZ.